United States Patent
Chaudhary et al.

(10) Patent No.: US 10,737,585 B2
(45) Date of Patent: Aug. 11, 2020

(54) ELECTRIC VEHICLE CHARGING INFRASTRUCTURE

(71) Applicant: International Business Machines Corporation, Armonk, NY (US)

(72) Inventors: Arjun Chaudhary, Essendon (AU); Julian de Hoog, Greensborough (AU)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 15/824,432

(22) Filed: Nov. 28, 2017

(65) Prior Publication Data

US 2019/0160958 A1    May 30, 2019

(51) Int. Cl.
| | |
|---|---|
| *B60L 53/66* | (2019.01) |
| *G06Q 10/10* | (2012.01) |
| *G06Q 50/06* | (2012.01) |
| *G06Q 10/06* | (2012.01) |
| *G06Q 50/30* | (2012.01) |

(52) U.S. Cl.
CPC ...... *B60L 53/665* (2019.02); *G06Q 10/06315* (2013.01); *G06Q 10/1095* (2013.01); *G06Q 50/06* (2013.01); *G06Q 50/30* (2013.01); *B60L 2230/16* (2013.01)

(58) Field of Classification Search
CPC ............ G06Q 10/00–50/00; B60L 1/00–58/00
USPC ............................................... 705/7.11–7.42
See application file for complete search history.

(56) References Cited

U.S. PATENT DOCUMENTS

| | | | |
|---|---|---|---|
| 5,548,200 A | 8/1996 | Nor et al. | |
| 8,531,162 B2* | 9/2013 | Hafner | B60L 53/665 320/137 |
| 8,538,694 B2* | 9/2013 | Conway | G01C 21/3469 340/995.19 |
| 9,158,962 B1* | 10/2015 | Nemat-Nasser | G06K 9/00845 |
| 9,227,522 B2* | 1/2016 | Jeong | B60L 11/1844 |
| 9,274,540 B2* | 3/2016 | Anglin | B60L 58/12 |
| 9,288,270 B1* | 3/2016 | Penilla | B60L 53/14 |
| 9,467,515 B1* | 10/2016 | Penilla | H01M 2/206 |
| 9,505,318 B2* | 11/2016 | Hendrix | B60L 11/1838 |
| 9,744,871 B2* | 8/2017 | Sabripour | G06Q 30/00 |
| 10,189,362 B2* | 1/2019 | Cun | H02J 7/0021 |
| 10,210,487 B2* | 2/2019 | Penilla | G06Q 10/1095 |
| 10,223,134 B1* | 3/2019 | Penilla | G06Q 20/18 |
| 2007/0005224 A1* | 1/2007 | Sutardja | G08G 1/0104 701/117 |

(Continued)

OTHER PUBLICATIONS

An, Qin. Optimal Management of an Integrated Electric Vehicle Charging Station under Weather Impacts. Diss. 2018. (Year: 2018).*

(Continued)

*Primary Examiner* — Alan S Miller
(74) *Attorney, Agent, or Firm* — Daniel R. Simek

(57) ABSTRACT

A system, method and program product for managing a network of electric vehicle charging stations. A system is provided that includes: a system for tracking a capacity of each charging station in the network; an interface that allows each of a set of electric vehicle operators to enter an itinerary; and a scheduling system that generates at least one proposed agenda for each itinerary that includes a route, at least one charging station, and a charging time window for each at least one station.

20 Claims, 5 Drawing Sheets

(56) References Cited

U.S. PATENT DOCUMENTS

| | | | |
|---|---|---|---|
| 2009/0313098 A1* | 12/2009 | Hafner | B60L 53/64 705/14.1 |
| 2009/0313103 A1* | 12/2009 | Ambrosio | B60L 8/00 705/14.25 |
| 2009/0313174 A1* | 12/2009 | Hafner | B60L 58/12 705/80 |
| 2010/0017249 A1 | 1/2010 | Fincham et al. | |
| 2010/0045452 A1* | 2/2010 | Periwal | B60Q 9/00 340/439 |
| 2010/0049533 A1* | 2/2010 | Ferro | G06Q 10/087 705/1.1 |
| 2010/0131139 A1* | 5/2010 | Sakai | B60L 7/14 701/22 |
| 2010/0181957 A1* | 7/2010 | Goeltner | B60L 53/64 320/101 |
| 2010/0228405 A1* | 9/2010 | Morgal | B62H 3/02 701/2 |
| 2010/0292857 A1* | 11/2010 | Bose | H02J 13/00001 700/292 |
| 2011/0246252 A1* | 10/2011 | Uesugi | B60L 3/12 705/7.12 |
| 2011/0277747 A1 | 11/2011 | Vollhardt et al. | |
| 2011/0288765 A1* | 11/2011 | Conway | G01C 21/3469 701/533 |
| 2012/0203726 A1* | 8/2012 | Klabjan | B60L 53/63 706/46 |
| 2012/0249068 A1 | 10/2012 | Ishida | |
| 2012/0259723 A1 | 10/2012 | Ansari et al. | |
| 2012/0319649 A1 | 12/2012 | Billmaier | |
| 2012/0330494 A1* | 12/2012 | Hendrix | B60L 11/1838 701/29.3 |
| 2013/0103378 A1* | 4/2013 | Tinnakornsrisuphap | B60L 58/13 703/18 |
| 2013/0110296 A1* | 5/2013 | Khoo | B60L 58/12 700/286 |
| 2013/0179061 A1* | 7/2013 | Gadh | H02J 3/14 701/123 |
| 2013/0226371 A1* | 8/2013 | Rovik | H04L 63/102 701/2 |
| 2013/0338820 A1 | 12/2013 | Corbett et al. | |
| 2014/0184170 A1* | 7/2014 | Jeong | B60L 11/1844 320/137 |
| 2014/0232566 A1* | 8/2014 | Mimeault | G01S 17/88 340/935 |
| 2015/0069970 A1* | 3/2015 | Sarkar | B60L 53/305 320/109 |
| 2015/0198459 A1* | 7/2015 | MacNeille | G01C 21/3697 701/22 |
| 2015/0249718 A1* | 9/2015 | Huybregts | G06K 9/00228 709/202 |
| 2015/0262206 A1* | 9/2015 | Dai | G06Q 50/30 705/7.31 |
| 2015/0306969 A1* | 10/2015 | Sabripour | G06Q 30/00 320/109 |
| 2015/0379331 A1* | 12/2015 | Nemat-Nasser | G06K 9/00845 382/118 |
| 2016/0126732 A1* | 5/2016 | Uyeki | B60L 53/63 700/295 |
| 2017/0103327 A1* | 4/2017 | Penilla | B60L 58/12 |
| 2017/0176195 A1* | 6/2017 | Rajagopalan | G01C 21/3415 |
| 2017/0210236 A1* | 7/2017 | Moell | B60L 53/50 |
| 2018/0007099 A1* | 1/2018 | Ein-Gil | H04L 63/08 |
| 2018/0089912 A1* | 3/2018 | Penilla | G06Q 10/20 |
| 2018/0111494 A1* | 4/2018 | Penilla | G06Q 20/127 |
| 2018/0186357 A1* | 7/2018 | Deshpande | B60L 58/12 |

OTHER PUBLICATIONS

Jin, Chenrui, Xiang Sheng, and Prasanta Ghosh. "Optimized electric vehicle charging with intermittent renewable energy sources." IEEE Journal of Selected Topics in Signal Processing 8.6 (2014): 1063-1072. (Year: 2014).*

Lee, Stephen, et al. "Shared solar-powered EV charging stations: Feasibility and benefits." 2016 Seventh International Green and Sustainable Computing Conference (IGSC). IEEE, 2016. (Year: 2016).*

Xydas, Erotokritos, Charalampos Marmaras, and Liana M. Cipcigan. "A multi-agent based scheduling algorithm for adaptive electric vehicles charging." Applied energy 177 (2016): 354-365. (Year: 2016).*

* cited by examiner

ELECTRIC VEHICLE CHARGING INFRASTRUCTURE

TECHNICAL FIELD

The subject matter of this invention relates to charging electric vehicles and more particularly to an infrastructure for managing a network of local energy charging islands for use by electric vehicles.

BACKGROUND

Electric vehicles (EVs) are clearly a growing segment of the transportation world. The continued challenge of EVs however remains the need for a robust charging infrastructure that will meet an operators' charging needs. While solutions are available in high density areas where the vehicles are primarily used for commuting and shorter drives, the problem becomes more complex for EVs utilized in long distance or remote driving.

In places that are connected to a reliable electrical grid, one solution is to simply set up enough charging stations to meet the demand. However, in remote areas and areas with an unreliable grid, solutions become more challenging. One approach is to set up local energy charging islands that for example rely on solar, wind or water power to generate and store localized (i.e., non-grid based) electrical power for EVs. For example, in desert locations and the like, there is often an abundance of solar energy that can be exploited with a solar farm. The solar energy collected from the farm can be stored in a micro storage facility and sold roadside to EV operators.

Inherent limitations of local energy charging islands however include the fact that because they are not connected to a grid, the stations can only provide a limited amount of electricity over any given period. Local energy charging stations do not have the virtually unlimited charging capabilities of grid based charging stations.

SUMMARY

Aspects of the disclosure provide an infrastructure for managing a network of local energy charging islands (i.e., charging stations) that are not connected to an electrical grid.

A first aspect discloses a system for managing a network of electric vehicle (EV) charging stations, comprising: a system for tracking a capacity of each charging station in the network; an interface that allows each of a set of EV operators to enter an itinerary; and a scheduling system that generates at least one proposed agenda for each itinerary that includes a route, at least one charging station, and a charging time window for each at least one charging station.

A second aspect discloses a computer program product stored on a computer readable storage medium, which when executed by a computing system, provides management for a network of electric vehicle (EV) charging stations, the program product comprising: program code that tracks a capacity of each charging station in the network; program code that allows each of a set of EV operators to enter an itinerary; and program code that generates proposed agendas for each EV operator that includes a route, at least one charging station, and a charging time window for each at least one charging station.

A third aspect discloses a computerized method management for managing a network of electric vehicle (EV) charging stations, the method comprising: tracking a capacity of each charging station in the network; receiving itineraries from a set of EV operators; and generating proposed agendas for each EV operator that includes a route, at least one charging station, and a charging time window for each at least one charging station.

BRIEF DESCRIPTION OF THE DRAWINGS

These and other features of this invention will be more readily understood from the following detailed description of the various aspects of the invention taken in conjunction with the accompanying drawings in which.

Figure 1:
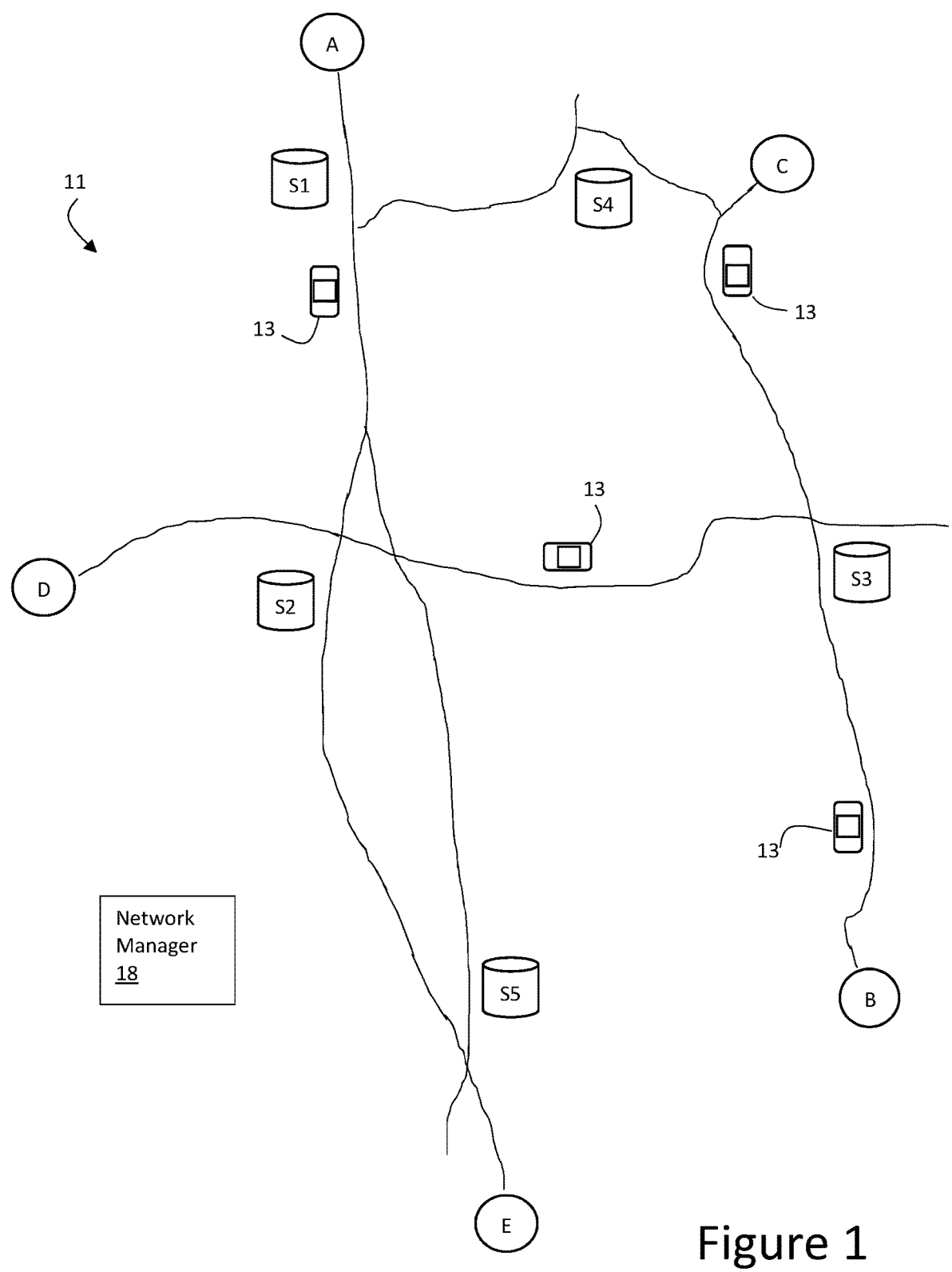
FIG. 1 shows a network of charging stations according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts various roadways 11 that for example extend over a remote geography in which there is no electrical grid. Depicted in the roadmap is a network of local energy charging islands (i.e., stations S1, S2, etc.) that act as charging stations for EVs 13 traveling the roadways 11. As is typical, each EV 13 has a unique range it can travel before being recharged, e.g., based on vehicle type, weather, model, load, speed, etc. Thus, a first EV traveling from point A to point B may require two charging stops, while a second EV may only require one. Furthermore, each station (S1, S2, etc.) has its own storage capacity, demand, pricing structure, etc.

Accordingly, in a "first come first served" approach to local energy charging islands, it is nearly impossible to guarantee that each EV 13 can obtain the necessary charges to complete a long trip while meeting all desired time and cost requirements. This uncertainty makes it less likely that EVs will be used in such environments. In the illustrative embodiments disclosed herein, solutions are provided for managing the local energy charging islands to reduce and/or eliminate such uncertainty. In one illustrative embodiment, a network of charging stations are remotely managed by a network manager 18 to schedule charging locations and times to EVs traveling through the network. In another illustrative embodiment, individual charging stations provide their own a priori scheduling.

Figure 2:
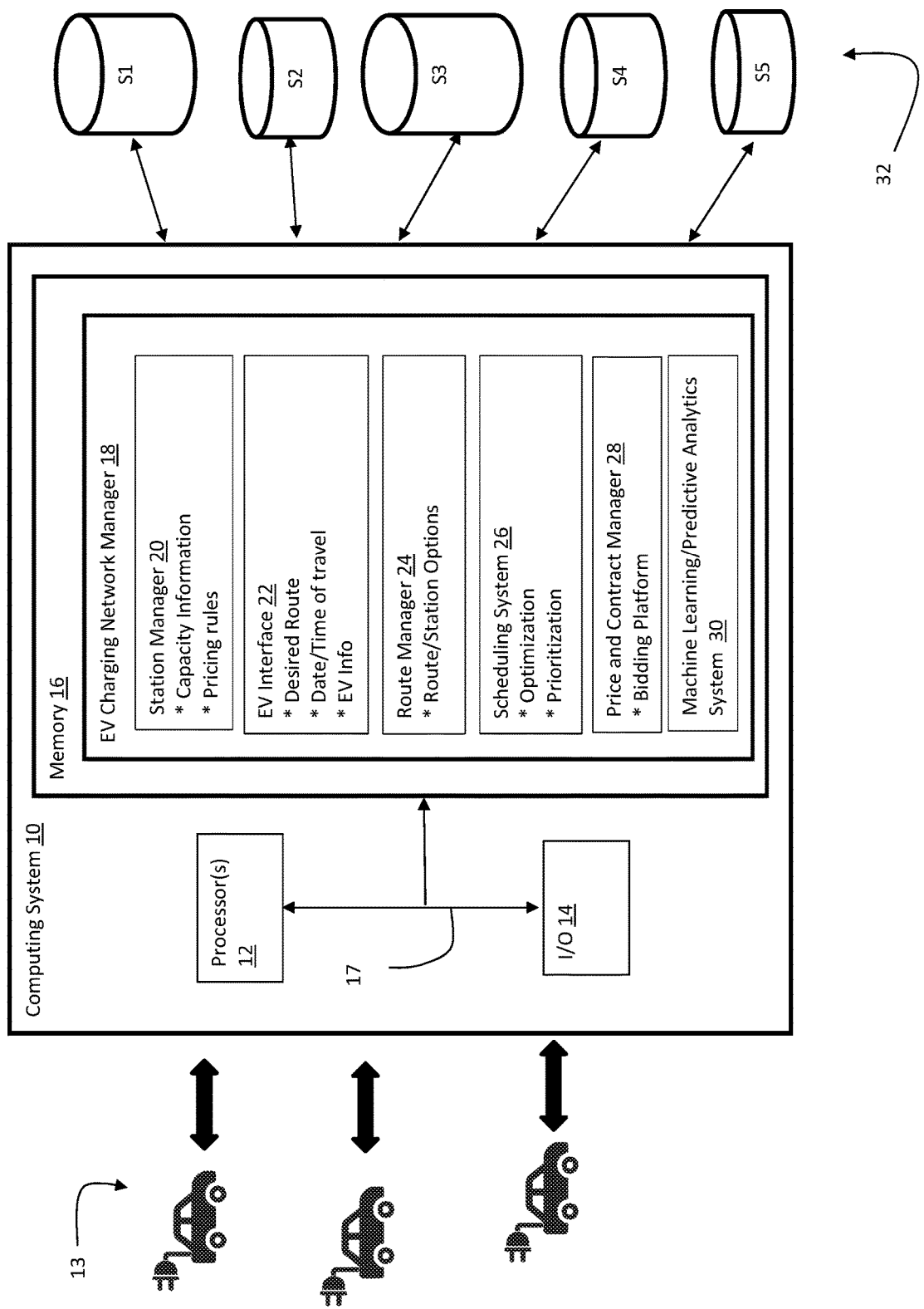
FIG. 2 shows a network manager according to embodiments.

FIG. 2 depicts a computing system 10 having an EV charging network manager ("network manager") 18 that locates and schedules the charging requirements of a set of participating EVs 13 traveling through a network 32 of local energy charging islands, i.e., "stations". In particular, EV charging network manager 18 ensures that the needs of each participating EV 13 can be met by one or more stations in the charging network 32. In order to effectuate this process, a station manager 20 is remotely connected to each station in the network 32, and tracks the capacity, as well as any pricing rules, for each station in the network 32. Capacity generally reflects a maximum number of energy units (e.g., kilowatt hours) available at each station and how long it takes to refresh the station after a charging operation (i.e., refresh rate). Capacity C may be provided as a function of time C(t) for each station 32 to account for changing capabilities of the station. For example, for a station that relies on solar, the refresh rate may be greatest at noon (resulting in high capacity) and much less at nighttime (resulting in low capacity). Tracked capacity for each station may be static in nature, i.e., capacity is primarily based on battery storage capability and the energy source utilized (e.g., a solar farm having n panels). Alternatively, the tracked capacity may be more dynamic in nature, i.e., in addition to storage capability and energy source, the capacity may be updated periodically based on current weather conditions, weather forecasts, wind conditions, historical data, etc.

In addition, each station in the network 32 may provide pricing rules that govern the cost to purchase energy units. For instance, a kilowatt hour may be priced at one level during peak periods and a lower level during other periods. In other cases, pricing rules for a given station may simply comprise a minimum price for each energy unit sold.

When an EV 13 wants to participate in the charging network 32 to travel through an associated geographic region, the operator of the EV 13 submits a request and engages with network manager 18 via an EV interface 22. (Note that the term EV "operator" may refer to and comprise a human, an autonomous system, and/or the EV 13 itself.) The EV interface 22 allows the operator to enter a travel itinerary, including a beginning and ending point, a desired route, a date and time of travel, any planned stops, and relevant information about the EV 13. Additional information that may be provided as part of the request may include a current state of the EV charge, and willingness to pay (i.e., a bid).

Once entered, a route manager 24 will determine the possible route/station options to handle the travel itinerary, i.e., get the EV 13 to its endpoint. For example, if a given EV 13 has a range of 300 miles, and there are three possible routes with five available stations, route manager 24 will determine all viable route and station options that can meet the 300 mile charging options. An estimated travel time may also be provided for each travel option. For example, based on the inputted travel plans for an EV 13, there may be five possible route/station options computed to get from A to B:

| Option | Route | Stations | Time |
|---|---|---|---|
| 1 | Route 4, Route 66, Route 10 | S1, S5 | 250 minutes |
| 2 | Route 4, Route 66, Route 10 | S1, S6 | 250 minutes |
| 3 | Route 4, Route 8 | S1, S4 | 285 minutes |
| 4 | Route 4, Route 8 | S2, S4 | 285 minutes |
| 5 | Route 4, Route 11, Route 10 | S1, S3, S6 | 310 minutes |

Once the route manager 24 determines all the possible route/station options, scheduling system 26 evaluates all participating EVs 13 utilizing the network during the same period, and computes one or more proposed agendas, either in a batch mode or on on-demand mode. A batch mode may for example be used to schedule a set of EVs 13 that submitted travel itineraries for travel during an overlapping period. An on-demand mode may be used to schedule individual EVs one-by-one as requests are received. Regardless, to compute the schedule, scheduling system 26 evaluates the capacity (C) of each station 32, the route/station options for each EV 13, and the projected time window (W) of when each EV 13 is expected to arrive at a station for each route/station option.

When a scheduling operation is computed in a batch mode, an optimization process may be implemented to provide sets of proposed agendas that most efficiently meet the needs of all participating EVs 13. In an on-demand mode, the scheduling system 26 may simply determine the best available agenda based on what is available. Prioritization may be given to certain EVs, such as emergency response vehicles, EVs in distress, etc. The proposed agenda may for example provide a set of viable alternatives available to each participating EV 13, in which each alternative includes a route, a list of stations, and a time window during which the EV 13 is scheduled to arrive for charging.

In addition, each proposed agenda may include pricing information generated by a price and contract manager 28. Pricing information for each charging operation may be based on pricing rules established by each station 32, rules for the entire network, or any other way. In one illustrative embodiment, a bidding platform may be provided to allow multiple EV operators to bid on a charging operation. In this manner, charging stations 32 experiencing higher demand or along more preferred routes can obtain a premium price. This also allows EV operators to balance cost and travel time. Note that due to the fluid nature of the supply and demand, the availability and pricing of presented scheduling options may change quite rapidly as EVs 13 fill up the schedule during busy time periods. Regardless, once an agenda and price is "accepted" by an EV 13, the price and contract manager 28 creates a binding contract, guaranteeing the EV 13 a charging window at each station specified in the selected agenda.

While the above embodiments are generally directed to a system in which proposed agendas are selected and accepted before each EV 13 begins travel, network manager 18 may be adapted to make scheduling changes dynamically to, e.g., handle situations where a station is not fully operational or an EV 13 breaks down, is running late to a station, or otherwise needs to modify its schedule after travel has begun. For example, if an EV operator decides during travel that they would like to make an unplanned stop for an extended period of time, or take a different route, the operator can submit a change request to the EV interface 22. The scheduling system 26 will then attempt to generate a set of agendas to meet the proposed change. If one of the agendas is acceptable to the operator, the schedule and associated contract can be updated on the fly. Similarly, in the case where a station cannot meet its charging obligations, scheduling system 26 will attempt to reschedule and notify impacted EVs 13.

Accordingly, during travel, an operator of an EV 13 may be presented with an alternative agenda (e.g., at a lower cost, shorter route, due to a station outage, etc.) by the scheduling system 26, which the operator can accept or decline. In this manner, alterations to the overall schedule can be dynamically accommodated, e.g., in the event another EV 13 requests a change to their plan.

Additionally, a machine learning/predictive analytics system 30 may be employed to further enhance the scheduling operation. For example, historical data may be analyzed to determine high and low demand times, the impact of weather, frequency of failures, optimal scheduling models, optimal pricing models, proposed locations/viability for new stations, etc.

Figure 3:
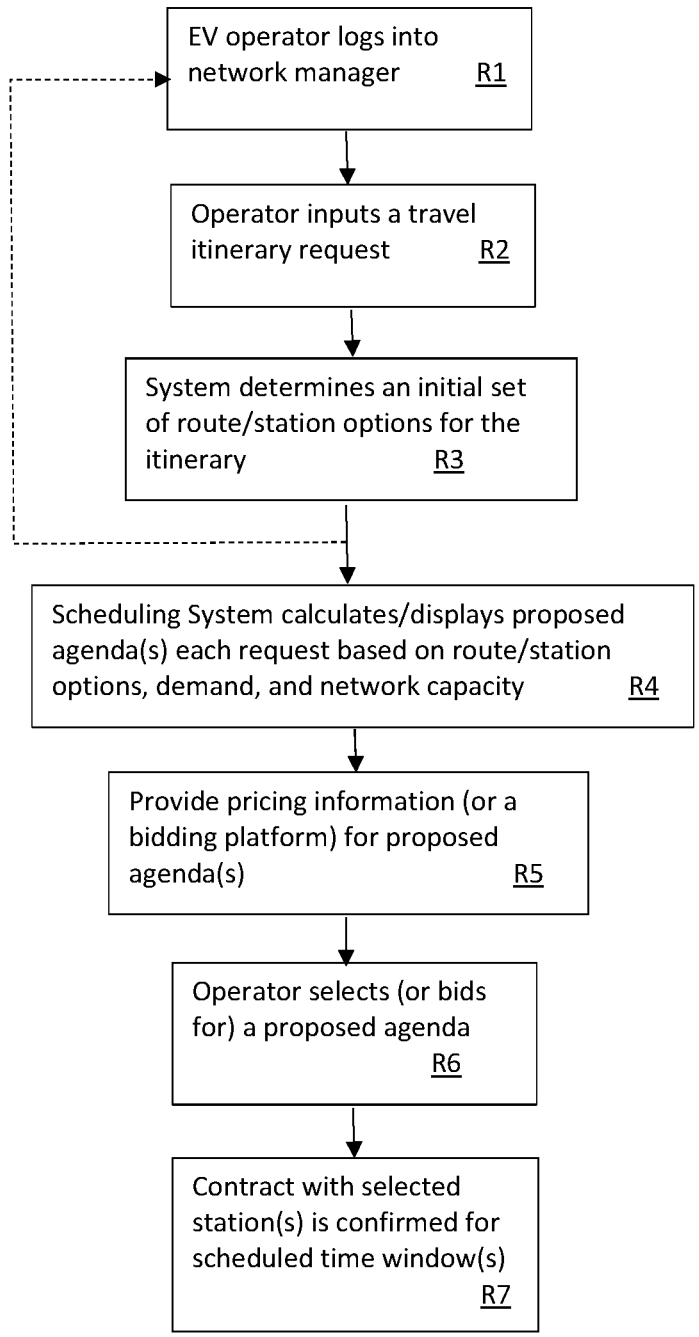
FIG. 3 shows a flow diagram of a method of managing a network of charging stations according to embodiments.

FIG. 3 depicts a flow diagram for implementing the network manager 18 of FIG. 2. At R1, an EV operator logs into the network manager 18, e.g., utilizing an app, a client, a smart device, etc., and at R2 the EV operator inputs a request that includes a travel itinerary. As noted, the itinerary generally includes a beginning point, an ending point, date/time of travel, planned stops, preferred route, EV specs, etc. At R3, the network manager 18 determines an initial set of route/station options that can fulfill the itinerary (without considering capacity, demand, etc.). In batch mode processing, steps R1-R3 are repeated for a period of time in order to schedule a larger set of requests at once. For example, network manager 18 may delay scheduling next day requests until 5 PM for requests collected earlier that day. In on-demand mode, requests are scheduled as they are received.

Regardless, at R4, the scheduling system calculates and displays proposed agendas for one or more requests based on route/station options, demand (i.e., number of requests that can be serviced by a given station), and network capacity. Proposed agendas generally include a route and time windows during which a set of associated charging stations are available for the EV operator. Proposed agendas may include all stations required to complete an itinerary or be broken into single station segments. For example, based on a submitted request, an EV operator may receive the following two proposed agendas (PAs) in which each agenda includes all stations to complete the itinerary:

| PA# | Trip Begin Time | Routes | Station: Time Windows |
|---|---|---|---|
| 1. | 9:30 AM Oct. 10, 2018 | Rt. 4, 100, 16 | S1: 1:30-2:00 PM, S3: 6:00-6:30 PM |
| 2. | 9:30 AM 1 Oct. 10, 2018 | Rt. 4, 16 | S1: 1:30-2:00 PM, S2: 6:15-6:45 PM |

In the batch mode case, scheduling multiple requests from different EV operators may be approached as an optimization problem where route/station options from different requests are iteratively analyzed. For example, a first request and a second request may both be preferably fulfilled using charging station S1 during the same time window. However, in a case where station S1 does not have the capacity to service both requests during the time window, alternative route/station options are sought for one of the requests. The process iterates until at least one proposed agenda is determined for all of the requests (or as many as possible).

At R5, pricing information is determined for each of the proposed agendas. Pricing information may be determined from pricing rules provided by each station as noted above. For example, pricing may be computed and provided for each proposed agenda as follows:

| PA | Price | Total Travel Time |
|---|---|---|
| 1. | S1: $2.12/KWH, S3: $4.44/KWH | 11:33 |
| 2. | S1: $2.12/KWH, S2: $2.24/KWH | 12:12 |

In the above example, a total travel time is also provided, which allows the operator to weight cost and time when selecting an agenda. At R6, the operator selects one of the presented agendas and at R7 a contract with the stations from the selected agenda is confirmed.

Alternatively, a bidding platform may be utilized in which the highest bidder is awarded a proposed agenda. For example, a timed auction may be presented where the operator can bid a price they will pay (or set of prices for different stations) for an agenda that can potentially fulfill requests for multiple EV operators. At the end of the auction, the highest bidder wins the agenda and auction process can be repeated for other agendas.

Figure 4:
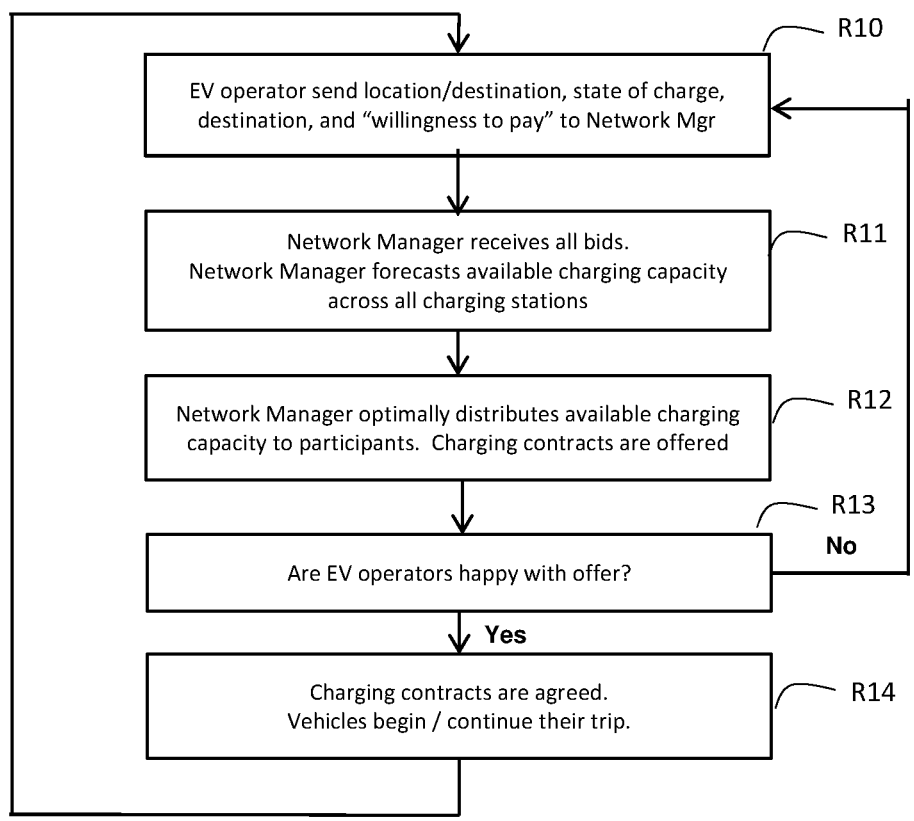
FIG. 4 shows a flow diagram of a method of managing a network of charging stations using a bidding platform according to embodiments.

FIG. 4 depicts a flow chart of a network management method that utilizes a bidding platform. At R10, an EV operator submits a location/destination, state of current charge, and a willingness to pay (i.e., bid) to the network manager 18. At R11, the network manager 18 receives all bids submitted over a period of time (e.g., every five minutes) and forecasts available charging capacity across all charging stations. At R12, the network manager 18 distributes available charging capacity to participants. At R13, a determination is made whether all EV operators are happy with the offer (i.e., proposed agenda). If yes, charging contracts are agreed upon and the EVs begin or continue their trip. If no, the process repeats for those operators unhappy with the offer.

Figure 5:
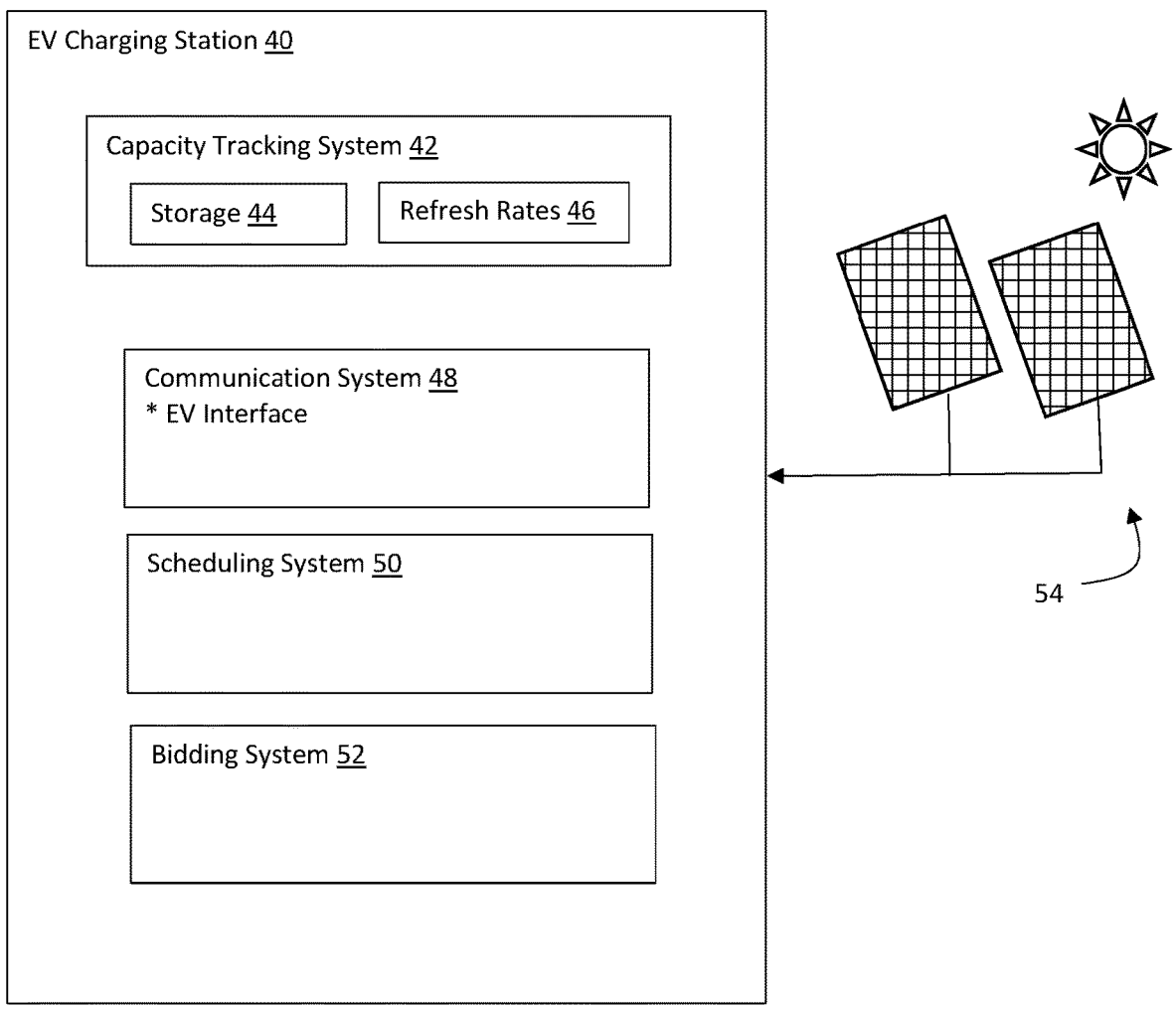
FIG. 5 shows a charging station according to embodiments.

FIG. 5 depicts an EV charging station 40 that relies on solar energy 54 to collect and store electrical energy. A capacity tracking system 42 is provided to manage/track storage 44 and refresh rates 46. In this embodiment, EV charging station 40 is configured to operate as a standalone system (i.e., apart from a network) to schedule charging operations for EVs. To implement this functionality, EV charging station 40 includes: a communication system 48 that allows EV operators to communicate directly with the station 40; a scheduling system 50 that accepts requests for a charging time window from EV operators; and a bidding system 52 that allows EV operators to bid for charging windows.

It is understood that network manager 18 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 10 (FIG. 2) may comprise any type of computing device and for example includes at least one processor 12, memory 16, an input/output (I/O) 14 (e.g., one or more I/O interfaces and/or devices), and a communications pathway 17. In general, processor(s) 12 execute program code which is at least partially fixed in memory 16. While executing program code, processor(s) 12 can process data, which can result in reading and/or writing transformed data from/to memory and/or I/O 14 for further processing. The pathway 17 provides a communications link between each of the components in computing system 10. I/O 14 can comprise one or more human I/O devices, which enable a user to interact with computing system 10. Computing system 10 may also be implemented in a distributed manner such that different components reside in different physical locations.

Furthermore, it is understood that network manager 18 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A system for generating an agenda of use of charging stations by one or more electric vehicles (EVs), the charging stations included in a network of charging stations located within a geographic area without power grid sources, the system comprising:

one or more computer processors;
one or more computer-readable storage media,
program instructions stored on the one or more computer-readable storage media for execution by at least one of the one or more processors, the program instructions comprising:
   program instructions to track information about the charging stations including a charging capacity, current charge level, refresh rate to reach capacity charge level, and weather conditions affecting refresh rate, associated with the location of respective charging stations in the network;
   program instructions to receive respective travel itineraries from one or more EVs of a plurality of EVs;
   program instructions to receive information regarding the one or more EVs including current charge level, travel range, and estimated load for the received travel itinerary, respectively, of the one or more EVs; and
   program instructions to generate at least one proposed agenda for each respective travel itinerary that includes a route, at least one charging station, and a charging time window for each of the at least one charging station identified in the at least one proposed agenda, based on the tracked information about the charging stations.

2. The system of claim 1, wherein each proposed agenda is determined based on an entered itinerary, the capacity of the charging stations in the network, and demand as determine by the quantity of itineraries received for a same travel period of time.

3. The system of claim 2, wherein the capacity for each charging station is based on a storage amount and a refresh rate, and wherein the refresh rate is based on weather conditions and a time of day.

4. The system of claim 1, wherein each proposed agenda includes pricing information associated with use of the respective charging stations in the network of charging stations.

5. The system of claim 1, further comprising:
   program instructions to receive a bid for reserving use of the one or more charging stations associated with a proposed agenda, based on a bidding platform.

6. The system of claim 1, wherein the at least one proposed agenda for the respective travel itineraries are scheduled in a batch mode.

7. The system of claim 1, wherein the at least one proposed agenda for the respective itineraries are scheduled in an on-demand mode.

8. A computer program product stored on a computer readable storage medium, which when executed by a computing system, provides management for a network of charging stations, located within a geographic area without charging station refresh capability by power grid sources, the program product comprising:
   program instructions to track information about the charging stations including a charging capacity, current charge level, refresh rate to reach capacity charge level, and weather conditions affecting refresh rate, associated with the location of respective charging stations in the network;
   program instructions to receive respective travel itineraries from one or more EVs of a plurality of EVs;
   program instructions to receive information regarding the one or more EVs including current charge level, travel range, and estimated load for the received travel itineraries, respectively, of the one or more EVs; and
   program instructions to generate at least one proposed agenda for the travel itineraries, respectively that includes a route, at least one charging station, and a charging time window for each of the at least one charging station identified in the proposed agenda, based on the tracked information about the charging stations.

9. The program product of claim 8, wherein each proposed agenda is determined based on an entered itinerary, the capacity of the charging stations in the network, and demand as determine by the quantity of itineraries received for a same travel period of time.

10. The program product of claim 9, wherein the capacity for each charging station is based on a storage amount and a refresh rate, and wherein the refresh rate is based on weather conditions and a time of day.

11. The program product of claim 8, wherein each proposed agenda includes pricing information associated with use of the respective charging stations in the network of charging stations.

12. The program product of claim 8, further comprising
   program instructions to receive a bid for reserving use of the one or more charging stations associated with a proposed agenda, based on a bidding platform.

13. The program product of claim 8, wherein the at least one proposed agenda for the respective travel itineraries are scheduled in a batch mode.

14. The program product of claim 8, wherein the at least one proposed agenda for the respective itineraries are scheduled in an on-demand mode.

15. A method for generating an agenda of use of charging stations by one or more electric vehicles (EVs), the charging stations included in a network of charging stations located within a geographic area without power grid sources, the method comprising:
   one or more processors tracking information about the charging stations including a charging capacity, current charge level, refresh rate to reach capacity charge level, and weather conditions affecting refresh rate, associated with the location of respective charging stations in the network;
   one or more processors receiving respective travel itineraries from one or more EVs of a plurality of EVs;
   one or more processors receiving information regarding the one or more EVs including current charge level, travel range, and estimated load for the received travel itineraries, respectively, of the one or more EVs; and
   one or more processors generating at least one proposed agenda for the respective travel itineraries that includes a route, at least one charging station, and a charging time window for each of the at least one charging station identified in the proposed agenda, based on the tracked information about the charging stations.

16. The method of claim 15, wherein each proposed agenda is determined based on an entered itinerary, the capacity of the charging stations in the network, and demand as determine by the quantity of itineraries received for a same travel period of time.

17. The method of claim 16, wherein the capacity for each charging station is based on a storage amount and a refresh rate, and wherein the refresh rate is based on weather conditions and a time of day.

18. The method of claim 16, wherein each proposed agenda includes pricing information associated with use of the respective charging stations in the network of charging stations.

19. The method of claim 18, wherein pricing information is determined based on bids received for a proposed agenda.

20. The method of claim 16, wherein the at least one proposed agenda for the respective itineraries are scheduled in a batch mode.

\* \* \* \* \*